United States Patent [19]

Messenger

[11] Patent Number: 4,596,904
[45] Date of Patent: Jun. 24, 1986

[54] TEST APPARATUS FOR TELEPHONE LINES

[75] Inventor: Frank Messenger, Atco, N.J.

[73] Assignee: John F. McCarthy, Inc., Narberth, Pa.

[21] Appl. No.: 614,438

[22] Filed: May 25, 2984

[51] Int. Cl.⁴ .............................................. H04M 3/30
[52] U.S. Cl. ...................... 179/175.25; 179/175.3 F; 321/51; 321/66
[58] Field of Search .................. 179/175.25, 175.13 F; 324/51, 66

[56] References Cited

U.S. PATENT DOCUMENTS 4,326,162  4/1982  Hankey .................................. 324/51

Primary Examiner—Stafford D. Schreyer
Attorney, Agent, or Firm—Woodcock, Washburn, Kurtz, Mackiewicz & Norris

[57] ABSTRACT

An apparatus for testing modular telephone cables in an unenergized multiline distribution system including a multiline trunk cable and one or more connected individual line cables. The apparatus includes a power unit with circuitry connecting one or more of the wires of an individual telephone line cable with battery or other current source and an indicator unit having a plurality of indicating devices such as incandescent lights or, preferably, light emitting diodes and circuitry connecting each potentially active wire in the trunk cable with one of the indicating devices. By various circuit schemes, identification of the individual line wires in the trunk cable, polarity of the connection and continuity of the wires between the end units can be determined from the indicating devices.

10 Claims, 14 Drawing Figures

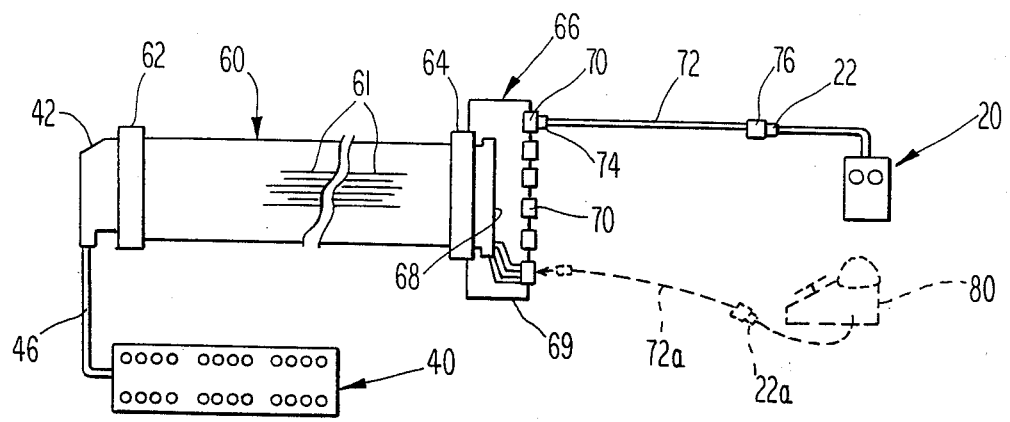
_Fig. 5_
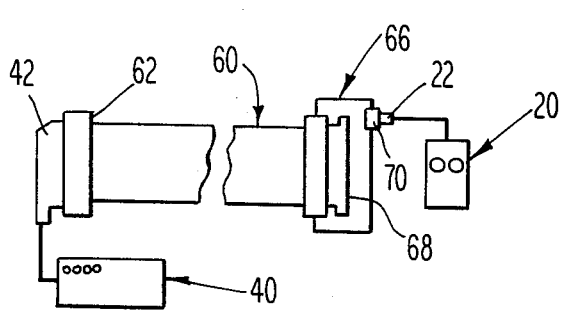
_Fig. 7_
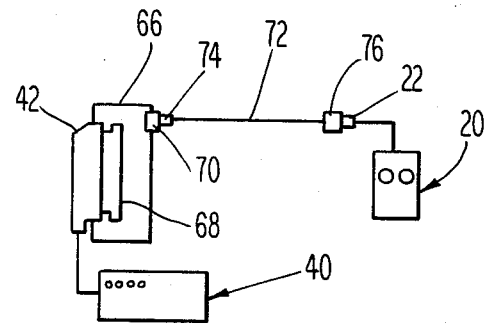
_Fig. 8_
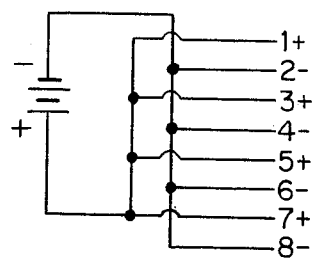
_Fig. 9_
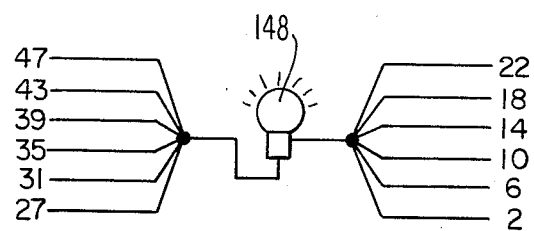
_Fig. 10_
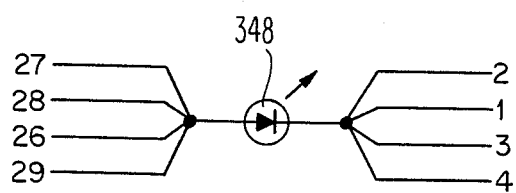
_Fig. 12_
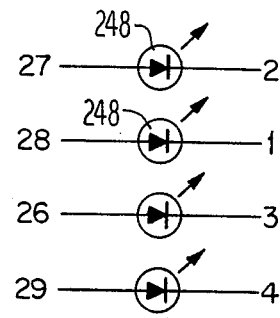
_Fig. 11_

TEST APPARATUS FOR TELEPHONE LINES

FIELD OF THE INVENTION

The invention relates to telephone test equipment and in particular to methods and apparatus for identifying individual lines in telephone signal distribution cables and testing the continuity of those lines.

BACKGROUND OF THE INVENTION

In office buildings and other commercial settings where a number of separate telephone lines are provided in areas remote from an interface with telephone company lines or a central switchboard, telephone signals are typically carried to individual telephones by means of multiline trunk cables. These cables can be run from an intermediate distribution point where the individual lines are collected together to or towards a central location such as the switchboard or telephone company line interface. Modern installation practice is to provide "modular" telephone cables with connectors at either end for easy identification and connection of all wire ends. Each cable carries the wire pairs for one or more individual lines. Depending upon the type of service provided, two to four wire pairs are typically used for each line. Interfacing boards are also typically provided at intermediate distribution points for convenient break out of the individual lines carried by a trunk cable. Such boards provide a trunk connector for receiving the connector at the proximal end of the trunk cable and, a number of individual line connectors each adapted to mate with a modular plug on the end of an individual line cable. Circuitry on the board completes the connections between the wires of the individual line cable and the trunk cable. Individual telephone end units such as telephones are then installed at the remaining end of the individual line cable, again typically by means of a standard, modular connector at the end of the individual line cable which will receive a standard modular plug from a telephone or other end unit.

One longstanding problem has been the identification of individual lines at the end of the trunk cable remote from the individual line connections. Unless careful notes are taken during installation, it is necessary by some means to ascertain the location of each individual phone line in the multiwire cable supplying it. This must be known so that the phone company can wire and program the system for use at their end. Historically, Bell employees have "talked" these lines out. This requires two people, one at the individual phone location and one at the end of the multiwire cable. The man on the multiwire wire cable must "hunt" for the other at the individual phone location. There is the necessity to check as many as 50 individul wires by this method. The number and small size of the wires makes this a laborious process. The time-consuming nature of such an identification process has caused the installation and maintenance of the distribution lines to be particularly expensive.

OBJECTS OF THE INVENTION

It is one object of the invention to provide for the quick and easy identification of individual end unit lines in a multiline telephone trunk cable carrying a number of individual lines.

It is another object of the invention to provide for easily testing the continuity of the wires of a line.

It is yet another object of the invention to provide for the simultaneous identification and continuity testing of an individual telephone line.

It is yet another object of the invention to perform the aforesaid objects on an unenergized telephone signal distribution network.

It is yet another object of the invention to perform the aforesaid objects using a direct current of low voltage for convenience and safety.

It is yet another object of the invention to provide method and apparatus for identifying reversed polarity connections during testing.

These and other objects which will be apparent from the following summary and description are provided by the invention.

BRIEF DESCRIPTION OF THE INVENTION

An individual line in a multiline telephone signal distribution cable is identified by connecting one or more current indicating devices of a read-out unit with different lines at one end of the cable and a power source unit supplying an electric current at an opposing end of the cable with the line to be identified so that a circuit is formed through the line between the power source and only the current indicating device or devices connected with that line. For safety and convenience, a source of direct current is used. Preferably, the current source is connected between at least one wire pair of the line so that the line itself provides the circuit connection between the power source and the read-out unit. While a single current indicating device may be connected across one wire pair of the line or connected in parallel across each wire pair of the line, for greater diversity an individual current indicating device is supplied for each wire pair of each line of the cable. This allows quick and easy continuity determination for each wire pair. Preferably, a single direct current source such as a simple transistor battery is connected across all wire pairs of the line at one time so that all pairs of the one line are simultaneously tested. Light emitting diodes are preferably used for indicating current flow and may be wired in a circuit such that all will pass current if properly connected with a multiline connector of the cable by means of a reciprocal multiline connector while only a predetermined subset will pass current if the connection between the multiline connector and reciprocal multiline connector is reversed.

The exemplary preferred embodiment power unit includes an individual line modular plug for connecting the power unit with a standard single line connector supplied at the end of an individual line linking the line with a telephone or other end unit device or supplied as part of an interfacing board for receiving a modular plug connector at the end of the single line cable. The power unit contains a transistor dry cell battery providing a direct current. Circuitry connects the battery in parallel across each of the wire pairs of the individual line. The read-out unit is provided with a multiline adaptor for connecting each active wire pair of a trunk cable with a separate light emitting diode. The diodes are suitably wired so as to be connected through the adaptor with the "active" wire pairs of the trunk cable. The power unit and read-out units are wired in such a way that all diodes are arranged to pass current if the connections between the power source and read-out unit are installed with the correct polarity and to pass current only on a predetermined subset of wire pairs if a connection is reversed. In this way, the user can ascertain whether the illuminated diodes are connected across the intended line of the cable or are improperly connected.

BRIEF DESCRIPTION OF THE DRAWINGS

FIG. 5 depicts the power source unit and read-out unit in use with a multiline telephone trunk cable and connected individual line cable;

FIG. 7 depicts the power source unit and read-out unit in use with a multiline trunk cable and a device for interfacing individual line cables (hereinafter "interfacer") with the multiline trunk cable;

FIG. 8 depicts the power source unit and read-out unit in use with an interfacer and individual line cable;

FIG. 9 depicts diagrammatically an alternate circuit for the power source;

FIG. 10 depicts diagrammatically a circuit of the read-out unit fo use with the power source circuit of FIG. 9;

FIG. 11 depicts diagrammatically an alternate circuit for a read-out unit for use with the power source unit of FIG. 9; and FIG. 12 depicts yet another embodiment of power source unit and read-out unit having a common return line.

DETAILED DESCRIPTION OF THE INVENTION

Figure 1:
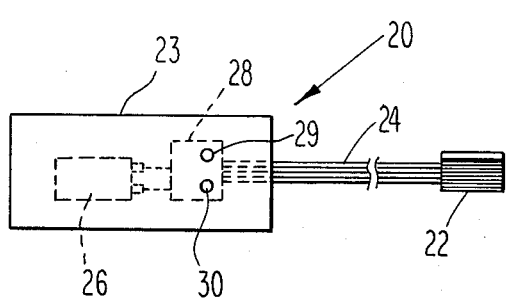
FIG. 1 depicts the power source unit of the invention.
Figure 1A:
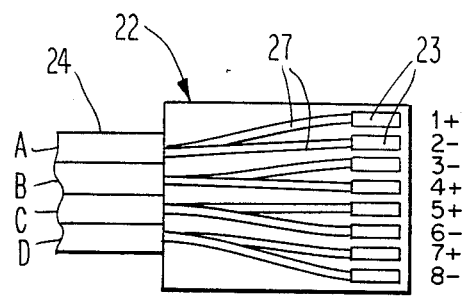
FIG. 1a depicts in an enlarged view, the standard 8 "pin" modular plug of the power source.

Depicted in FIG. 1 is a power source unit 20 of the invention for energizing a portion of a four wire pair telephone signal distribution network for test purposes. The unit 20 includes a standard, "modular" 8 "pin" telephone plug 22 attached at an end of an eight wire cable 24 connected with a box 25. The box 25 contains a 3-volt transistor battery 26 (depicted in phantom), circuit connections (represented diagrammatically by the phantom box 28) between the two poles of the battery 26 and eight wires of the cable 24, a battery test button 29 and battery status light 30. Referring to FIG. 1a, the connector 22 is a standard four wire pair modular telephone plug, such as an AMP-554112-1 and includes eight individual, exposed metallic conductors 23 electrically and physically connected with the eight individual wires 27 of the single line cable 24. Standard numbering of the eight individual wires of the line is indicated by the numbers 1-8 on the right side of the figure. The four wire pairs of the line are identified as A-D on the left side of the figure.

Figure 2:
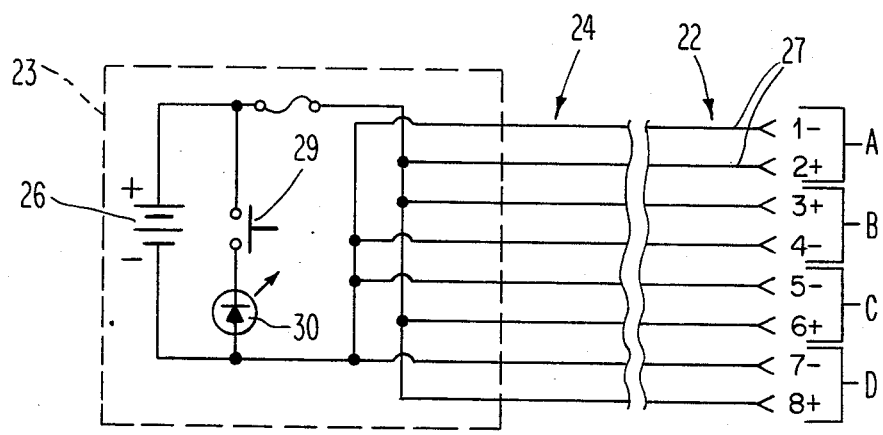
FIG. 2 depicts diagrammatically an exemplary preferred circuit for the power source unit.

FIG. 2 depicts an exemplary preferred circuit connection between the eight wires 27 (wire pairs A-D) with the battery 26. Individual wire pairs A-D are connected in an asymmetric manner so as to provide polarity as well as continuity information when used with the read-out unit of FIGS. 3-4. In particular, odd numbered wire 3 and even numbered wire 4 of the wire pair B are connected with the positive and negative poles, respectively, of the battery 26 while the odd numbered wires (1, 5, and 7) and the even numbered wires (2, 6, and 8), of the remaining pairs A, C, and D are connected to the negative and positive poles, respectively. The purpose of this asymmetric arrangement is to provide different polarity states in the wire pairs of each individual line. If, for any reason, the wire pairs are rearranged, particularly as might occur by an unseen twist in a trunk cable or improper attachment of the read-out unit, a characteristic indication will result. This will be explained in greater detail below in connection with the description of the operation of the system. As is also shown in FIG. 2, the battery status indicator light 30 is a light emitting diode which is connected across the poles of the battery 26 by means of the test button 29. The use of a diode 30 assures that the battery is initially installed in proper polarity with respect to the wires of the wire pairs A-D. The diode further indicates by its glow that the battery 26 is providing a sufficient current for operation.

Figure 3:
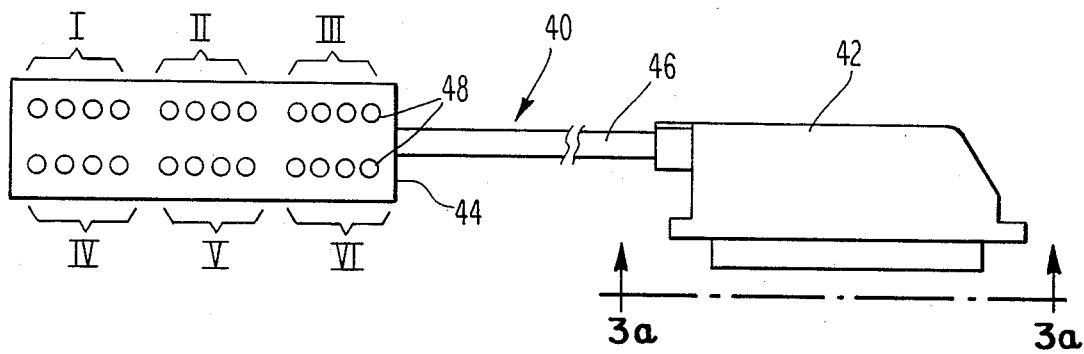
FIG. 3 depicts the read-out unit of the invention.
Figure 3A:
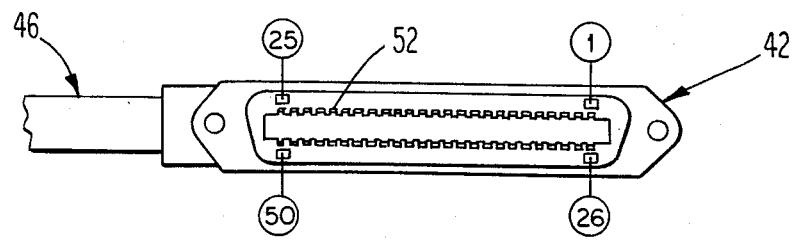
FIG. 3a depicts in an enlarged view, the face of the standard 50 connector receptacle of the read-out unit.

FIG. 3 depicts the preferred read-out unit 40 of the invention which is formed by a standard, fifty connector receptacle 42 such as a CINCH 77-82500 electrically and physically connected with a read-out box 44 by means of a fifty wire cable 46. The box 44 contains 24 individual light emitting diodes 48 arranged in six groups or "QUADs" of four diodes each. The groups or QUADs are numbered I-VI and each represents a different four wire pair telephone line. The connector 42 is shown in greater detail in FIG. 3a with the fifty individual exposed conducting connectors 52 indicated. Each exposed connector 52 is physically and electrically connected with an individual wire 54 in the cable 46. Standard numbering of the 50 pin connectors 52 is sequential, first along one side and then along the opposing side of the connector in the manner indicated in the figure by the encircled pin numbers "1", "25", "26" and "50" which are also printed on the depicted face of the connector in the four small indicated boxes.

Figure 4:
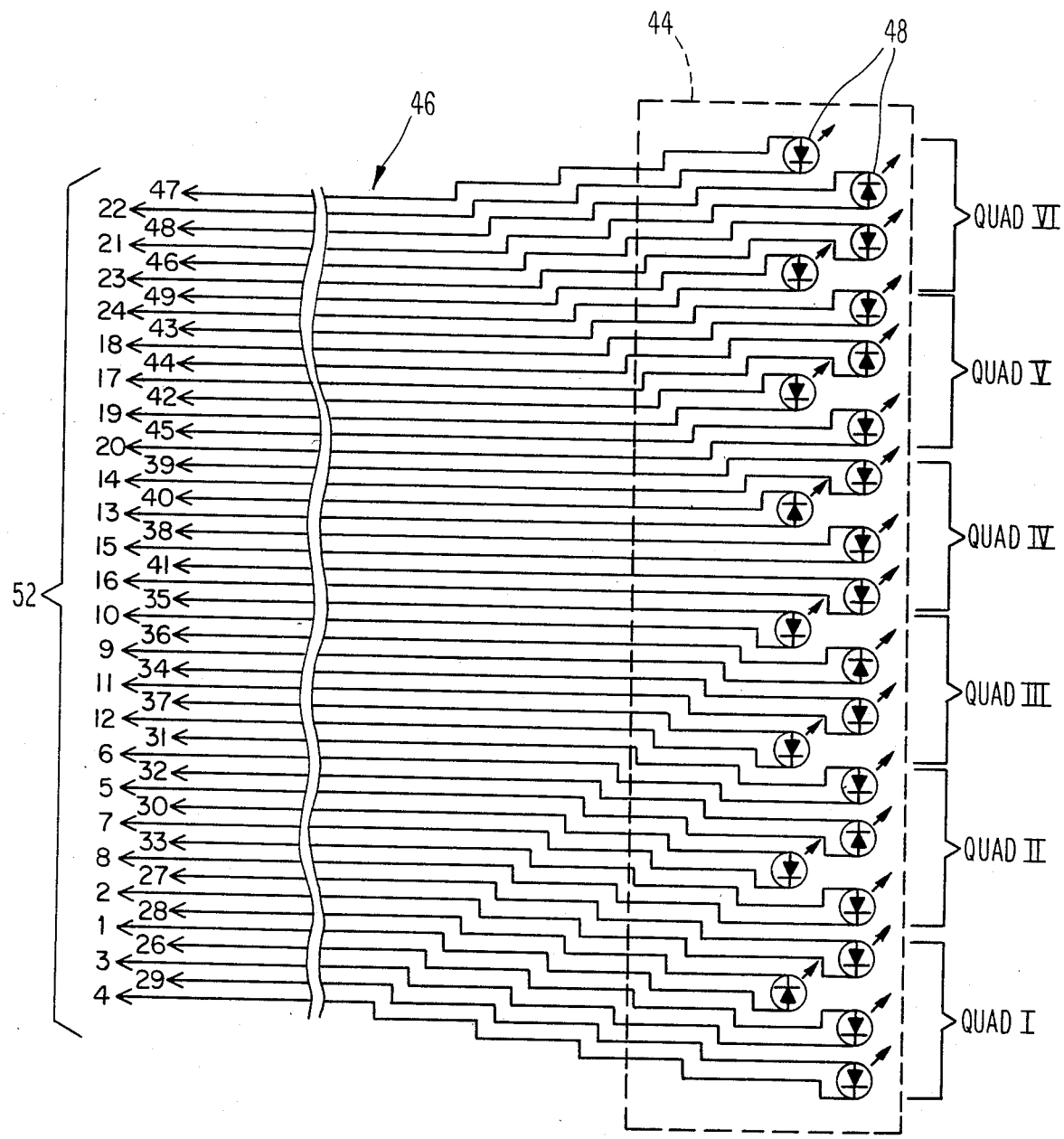
FIG. 4 is a circuit diagram of the read-out unit of FIG. 3.

FIG. 4 depicts an exemplary preferred connection of the light emitting diodes ("LEDs") 48 with 48 "active" wires of the cable 46 (wires numbered 25 and 50 of the cable 46 are not typically associated with any individual telephone line). The relationship between the numbered pins 52 and six four wire pair QUADs I-VI is further depicted. As can be seen from FIGS. 2 and 4, the individual LEDs 48 of each QUAD are asymmetrically wired, the polarity of the B wire pair (lines 3 and 4) LED being the reverse of that of the LEDs associated with the remaining wire pairs A (lines 1 and 2), C (lines 5 and 6), and D (lines 7 and 8). This asymmetric arrangement is repeated identically in each QUAD. This reversal of polarity of the LED associated with wire pair B in each QUAD is necessary because of the reversed polarity of the wire pair B in the power source unit 20 (see FIG. 2). When the battery 26 of FIGS. 1-2 is connected with the read-out unit 40 of FIGS. 3-4 in the correct polarized relationship, all LEDs 48 of each QUAD are in the correct orientation to pass the current supplied through the connected wire pairs A-D. In the event that polarity is reversed for any reason, such as by a backward connection of the connector 42 or, a twist in the trunk cable between the units 20 and 40 (See FIG. 5) the two center LEDs 48 connected across wire pairs B and C will still be in a proper electrical orientation to pass current while the two outer LEDs will not. The lighting of only one or both of the two inner LEDs 48 associated with wire pairs B and C in any QUAD will alert the user to the possibility of polarity reversal. This feature is particularly important in individual line identification because such identification is based upon expected circuit paths between the power source unit 20 and read-out unit 40. This asymmetric polarity feature of the invention also provides a means for insuring correct installation of the units 20 and 40 during use. The depicted circuitry in FIGS. 2 and 4 is exemplary and it is expected that one skilled in the art would be aware of other circuit arrangements that could be used to indicate a reverse polarity condition and that comparable circuits could be devised for the two and three wire pair individual line telephone systems also installed.

FIG. 5 depicts an installation of the power unit 20 and read-out unit 40 with an unenergized portion of a telephone signal distribution system. The distribution system includes a multiline trunk cable 60 with fifty individual wires 61 (only some of which are depicted diagrammatically); a standard 50 "pin" connector 62, again such as a CINCH 77-72500 50 connector plug and a standard 50 "plug" reciprocal connector 64, such as a CINCH 77-82500 50/rec. at either end of the cable. An interfacer 66 such as an AMP 50 wire distribution block 553866 includes a standard 50 "pin" connector 68 like the connector 62 for coupling with the connector 64 and up to six standard 8 wire "female" individual line connectors 70 for receiving a standard four pair modular telephone plug like the plug 22; and one of up to six individual telephone line cables 72 having, in this case, four wire pairs. Each cable 72 includes, a first, standard four wire pair modular plug connector 74, like the connector 22 (AMP 554112-1) for connection with the reciprocal eight wire "female" plug connector 70 of the interfacer 66 and a second "female" eight wire plug connector such as an AMP MODULAR JACK COUPLER #553738-1 for receiving a standard, four wire pair modular type connector from a telephone (as indicated in phantom for modular jack 22a of telephone 80 connected with line 72a) or another telephone end unit device. A ribbon type trunk cable 60 is depicted and has 25 wire pairs in a fixed, predetermined arrangement. This type of telephone cable is widely being adapted for telephone system installation because of its ease of installation and its low profile cross-section which allows the cable to be used unobtrusively under carpeting. Alternatively, the multiline cable 60 may be an older, bundled type cable having separate color-coded individual lines in a tubular covering.

Figure 6:
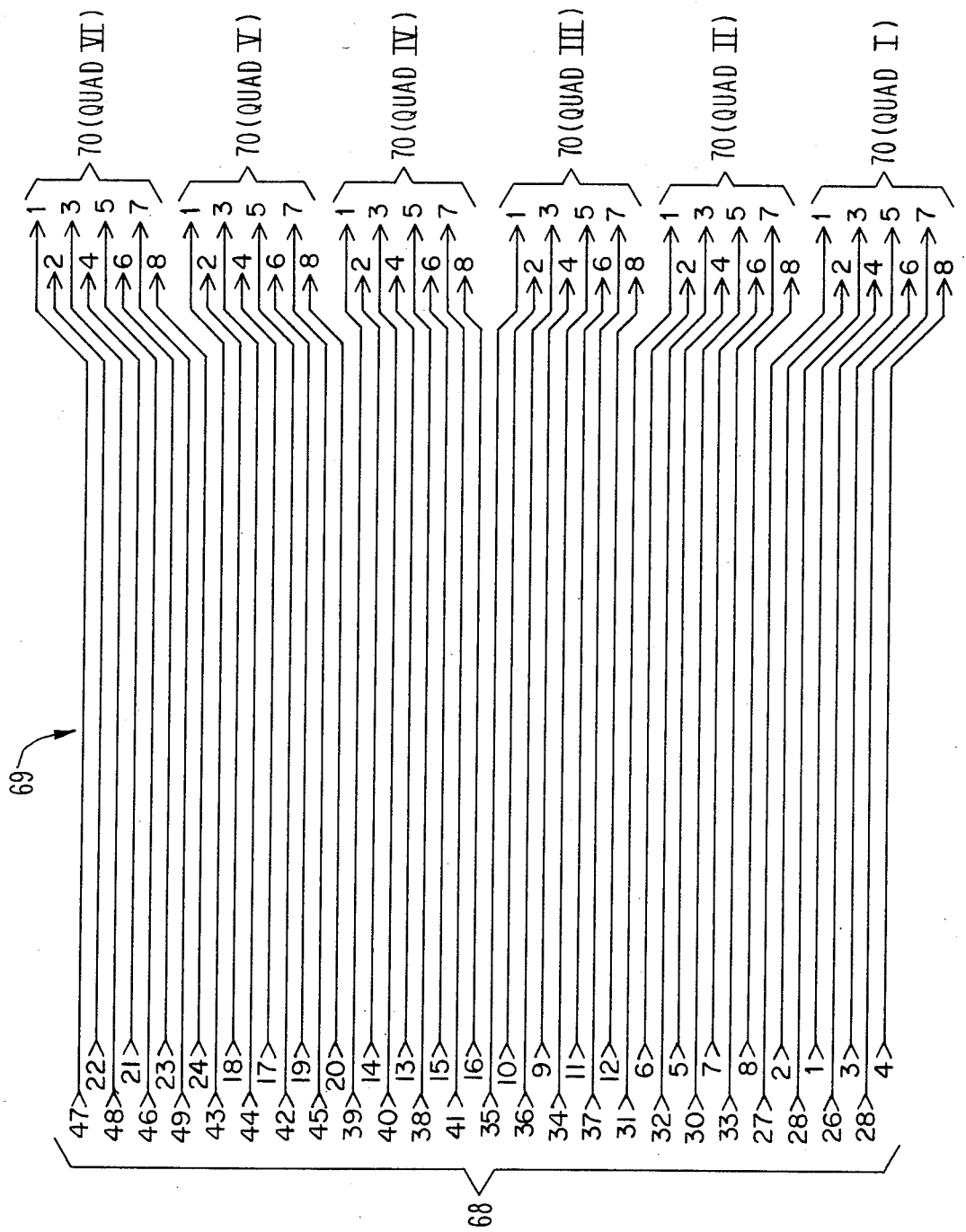
FIG. 6 depicts diagrammatically the arrangement of the 50 wires of the trunk cable into six four wire pairs or "QUADS" each constituting an individual telephone line.

FIG. 6 depicts the electrical connection provided by a printed circuit board 69 of the interfacer 66 between each of the eight pin connectors 70 and 48 of the 50 lines of the standard fifty pin connector 68 by printed circuits 71 (only some of which are depicted representatively on board 69). The board 69 also mounts and supports the connectors 68 and 70. The numbering of the individual nine pairs of the six, identical connectors 70 (QUADs I-VI) is the same as the numbering of wires of the power source plug 22, and of plug 74 and conductor 76 of the single line cable 72. The numbering of the 50 pin connector 68 is the same as the numbering of the connector 42 of the read-out unit 20 and of the connectors 62 and 64 on the trunk cable 60. Again, pins 25 and 50, if provided, are not used.

Operation of the units 20 and 40 will now be described with respect to FIGS. 5, 7 and 8. (Only four of the 48 LEDs 48 are depicted in FIGS. 7 and 8 for brevity.) To identify an individual line 72 in the multiline trunk cable 60, the power source 20 is connected into a connector 76 of the line to be identified, as indicated in FIG. 5, or directly into a standard connector 70 of the interfacer 66 associated with the line, as depicted in FIGS. 7 and 8. If the circuit elements are arrayed in the correct polarity between the power source unit connector 22 and the read-out unit connector 42 and the four wire pairs of the individual line are continuous (i.e., not in a shorted or open condition), then the four LEDs 48 of one QUAD I-VI will light in the read-out unit 40. If there is a reversal of polarity somewhere in between the connectors 22 and 42, only the two inner LEDs 48 of one QUAD will illuminate. Once the source box 20 and read-out box 40 are connected with the correct polarity, the failure of a led 48 to illuminate indicates an "open" or "shorted" condition of the wire pair (or failure of the LED). In this way, the devices 20 and 40 allow not only the rapid identification of an individual line in the multiline cable, but also indicates the condition of each of the wire pairs of the line between the boxes 20 and 40.

If one or several LEDs 48 of a QUAD fail to illuminate in the read-out unit 40, the separate components of the line can be tested. The configuration depicted in FIG. 7 illustrates the testing of the interfacer 66 and trunk cable 60. The configuration depicted in FIG. 8 depicts the testing of the interfacer 66 and individual line 72. To test the interfacer 66, the individual line 72 is disconnected from the connector 70 in FIG. 8 and the power source plug 22 inserted in place of the single line plug 74. (Note, an interfacer 66 may be used in this configuration to initially test the condition of the LEDs 48 in the read-out unit 40, the power source connector 22 being inserted into each connector 70 of the interfacer 66 in sequence.)

It will be appreciated that less versatile test units based generally upon the described preferred embodiment of the invention may be provided. For example, if only continuity testing is desired, each wire pair may be connected in any desired fashion across the poles of the battery 26 such as the symmetric connection illustrated diagrammatically in FIG. 9. In this case, small direct current powered lights without a diode feature could be substituted directly for the LEDs 48 of the read-out unit 40 of FIGS. 2-3. Alternatively, the same wire pairs (A-D) of each of the six individual lines of the cable 60 could be connected in parallel across the same four current indicators. The wiring of the wire pair A of each QUAD I-VI in parallel across one light 148 is illustrated diagrammatically in FIG. 10. A LED bulb can be substituted for the light 148, if desired. The wiring of the other wire pairs B-D with the three other LEDs or lights would be similar.

If only identification of individual lines is desired, the four wire pairs can be connected with the power source and current indicators in a manner so that all pairs carry current if the polarity is correct and none carry current if the polarity is reversed. The circuit configuration of the LEDs 248 of one QUAD of such read-out box for use with the source unit circuit of FIG. 9 is illustrated in FIG. 11. Alternatively, all four wire pairs of each QUAD may be connected across a single LED 348 in a manner depicted in FIG. 12. The circuit of FIG. 12 is to be used with the source unit wired as indicated in FIG. 9.

While a preferred and other embodiments of the invention have been described and modifications thereto suggested, the above description of the invention will suggest other configurations and methods of use to one skilled in the art. The invention is not limited to the above described exemplary embodiments but is defined by the accompanying claims.

What is claimed is:

1. A system for identifying individual telephone lines in an unenergized telephone signal distribution system including a trunk cable containing a multiplicity of wire pairs forming at least portions of a plurality of individual telephone lines, each line comprising a plurality of the wire pairs, the trunk cable having a multiline connector at one end thereof electrically connected with the wires at the trunk cable and an individual line connector at a remaining end electrically connected with the wire pairs on one line of the cable comprising:
   a source of electric current;
   first circuit means for electrically connecting said source in a circuit with wires of the individual line at said remaining end of the trunk cable;
   a plurality of electric current indicator means; and
   second circuit means for electrically connecting each indicator means in a circuit with a different line at the one end of the cable whereby said source forms a circuit with only the one indicator means connected with said one line.

2. The system of claim 1 wherein said source supplies direct current.

3. The system of claim 2 wherein said first circuit means connects the direct current source in the circuit between the two wires of one wire pair of the one line.

4. The system of claim 3 wherein each indicator means comprises:
   a plurality of light-emitting devices; and
   wherein said second circuit means connects each device in a circuit across a different wire pair of the line connected with the indicator means.

5. The system of claim 4 wherein said first circuit means simultaneously connects said source between the two wires of each wire pair of the one line.

6. The system of claim 5 wherein said remaining end of said cable terminates in a multiline connector offering electrical connections with each wire of said multiplicity of wire pairs and further comprising:
   a like multiplicity of light emitting diodes which includes said plurality of diodes;
   reciprocal multiline connector means adapted for coupling with said multiline connector and electrically connecting each of said multiplicity of light emitting diodes with a different wire pair of the cable through said second circuit means; and
   wherein said second circuit means and said diodes are arranged such that one diode is oriented across each wire pair of the one line to pass said direct current when said multiline connector and said multiline reciprocal multiline connector means are connected in a predetermined orientation and at least one diode of the plurality is connected across at least one wire pair of the one line in an orientation not to pass said direct current when said multiline connector and said reciprocal multiline connector means are connected in a reversed orientation.

7. The system of claim 5 wherein at least one light-emitting device in each indicating means is a light-emitting diode brightening only when a direct current passes through the diode in a predetermined direction.

8. The system of claim 7 wherein:
   said source has two poles;
   said first circuit means includes a reciprocal individual line connector adapted for mating with said individual line connector to connect one wire of each wire pair of only the one line to one pole of the current source and the remaining wire of each wire pair of only the one line to the remaining pole; and
   said second circuit means includes a reciprocal multiline connector adapted for mating with said multiline connector to connect each of said diodes across a different wire pair of the trunk cable in a manner such that all diodes of the indicating means of the one line will pass current when the connection between said multiline line connector and said reciprocal multiline connector is in a predetermined orientation and only a subset of the diodes of an indicating means will pass current when said connection between said multiline connector and said reciprocal multiline connector is reversed.

9. A system for testing the continuity of a telephone line having a plurality of unenergized wire pairs comprising:
   a first device comprising:
      current means having two poles for supplying a source of direct electric current; and
      first circuit means for simultaneous connecting said current means across the two wires of each said wire pair at one end of the line, one wire of each wire pair to one pole of the current means and the remaining wire of each wire pair to the remaining pole;
   wherein said remaining end of the telephone line terminates in a connector presenting connections with each wire of the wire pairs of the line and with a multiplicity of other wires of other lines; and a second device comprising:
      a like plurality of current indicating light emitting diodes; and
      second circuit means for connecting each current indicating light emitting diode in a separate circuit with said current means across a separate wire pair of the line at the remaining end of the line and including adapter means for connecting said second circuit means and said diodes with said connector, said second circuit means connecting said diodes so that all are arranged to pass current when the adapter is connected in a first orientation, and less than all of the diodes are arranged to pass the current when the adapter is connected in some other orientation.

10. A system for identifying individual lines in an unergized signal wire distribution system including a trunk cable containing a multiplicity of wire pairs forming at least portions of a plurality of individual lines, each line two or more of the wire pairs of the trunk cable, comprising:
   a first hand-held unit including a like plurality of electric current indicator means and first circuit means adapted for electrically connecting each indicator means in a circuit with a separate line of a trunk cable; and
   a second hand-held unit including a source or electric current and second circuit means adapted for electrically connecting said source of electric current in a circuit with only one of the plurality of lines through said trunk cable whereby said source forms a circuit with only the one indicator means connected with said one line.

* * * * *

UNITED STATES PATENT AND TRADEMARK OFFICE
CERTIFICATE OF CORRECTION

PATENT NO. : 4,596,904

DATED : June 24, 1986

INVENTOR(S) : Frank Messenger

It is certified that error appears in the above-identified patent and that said Letters Patent is hereby corrected as shown below:

Claim 10, line 2, column 8, please delete "unergized" and insert therefor --unenergized--.

Signed and Sealed this

Twenty-first Day of October, 1986

[SEAL]

Attest:

DONALD J. QUIGG

*Attesting Officer*  *Commissioner of Patents and Trademarks*